(12) United States Patent
Smadi et al.

(10) Patent No.: US 10,203,870 B2
(45) Date of Patent: Feb. 12, 2019

(54) AUTHENTICATION USING A TOUCH-SENSITIVE KEYBOARD WITH DISTINCT PLURALITIES OF KEYS AS RESPECTIVE REGIONS

(71) Applicant: BlackBerry Limited, Waterloo (CA)

(72) Inventors: Mohammed Nawaf Smadi, Ancaster (CA); Timothy Herbert Kyowski, Kitchener (CA)

(73) Assignee: BlackBerry Limited, Waterloo (CA)

( * ) Notice: Subject to any disclaimer, the term of this patent is extended or adjusted under 35 U.S.C. 154(b) by 16 days.

(21) Appl. No.: 14/680,700

(22) Filed: Apr. 7, 2015

(65) Prior Publication Data

US 2016/0299682 A1    Oct. 13, 2016

(51) Int. Cl.
*H04L 9/32* (2006.01)
*G06F 21/31* (2013.01)
*G06F 21/32* (2013.01)
*G06F 21/36* (2013.01)
*G06F 21/82* (2013.01)
*G06F 3/0488* (2013.01)

(52) U.S. Cl.
CPC ........ *G06F 3/04886* (2013.01); *G06F 3/0488* (2013.01); *G06F 3/04883* (2013.01); *G06F 21/31* (2013.01); *G06F 21/32* (2013.01); *G06F 21/36* (2013.01); *G06F 21/82* (2013.01); *H04L 9/3226* (2013.01); *G06F 2200/1637* (2013.01); *G06F 2221/031* (2013.01)

(58) Field of Classification Search
CPC ........ G06F 1/1662; G06F 3/017; G06F 3/023; G06F 3/0233; G06F 3/03547; G06F 3/041; G06F 3/0412; G06F 3/0426; G06F 3/0487; G06F 3/0488; G06F 3/04886; G06F 21/31; G06F 21/82; G06F 21/83; G06F 2203/04104; B60K 2350/1052
See application file for complete search history.

(56) References Cited

U.S. PATENT DOCUMENTS

| | | | |
|---|---|---|---|
| 6,204,839 B1 | 3/2001 | Mato, Jr. | |
| 7,808,488 B2 | 10/2010 | Martin et al. | |
| 8,063,879 B2 | 11/2011 | Moosavi et al. | |
| 8,638,939 B1* | 1/2014 | Casey | G06F 21/36 380/277 |
| 2002/0049070 A1* | 4/2002 | Bick | G06F 3/0202 455/550.1 |
| 2002/0109677 A1* | 8/2002 | Taylor | G06F 3/0233 345/173 |
| 2004/0165924 A1* | 8/2004 | Griffin | G06F 1/1626 400/486 |

(Continued)

OTHER PUBLICATIONS

European Office Action, Application No. 16159168.0, dated Oct. 25, 2017.

*Primary Examiner* — Keith L Crawley
(74) *Attorney, Agent, or Firm* — Ridout & Maybee LLP (57) ABSTRACT

For a computing device that employs a touch-sensitive keyboard, authentication may involve illustrating, to the electronic device, knowledge of a stored secret though providing input, at least in part, via the touch-sensitive keyboard. The input may be in the form of swipes alone or in combination with key actuations. Furthermore, the swipes and key actuations may be associated with a particular region of the touch-sensitive keyboard.

15 Claims, 4 Drawing Sheets

(56) References Cited

U.S. PATENT DOCUMENTS

| | | | |
|---|---|---|---|
| 2005/0280560 A1* | 12/2005 | Moon | G06F 1/1613 |
| | | | 341/22 |
| 2006/0174339 A1* | 8/2006 | Tao | G06F 21/36 |
| | | | 726/18 |
| 2008/0072036 A1* | 3/2008 | Anzelde | G06F 21/31 |
| | | | 713/155 |
| 2009/0199295 A1* | 8/2009 | Shih | G06F 21/36 |
| | | | 726/18 |
| 2010/0090958 A1* | 4/2010 | Perez | G06F 1/1662 |
| | | | 345/169 |
| 2010/0180336 A1* | 7/2010 | Jones | H04L 9/3226 |
| | | | 726/19 |
| 2010/0328251 A1 | 12/2010 | Sinclair | |
| 2012/0119997 A1* | 5/2012 | Gutowitz | G06F 3/0219 |
| | | | 345/168 |
| 2013/0046544 A1* | 2/2013 | Kay | G06F 3/04883 |
| | | | 704/275 |
| 2014/0078063 A1* | 3/2014 | Bathiche | G06F 3/0234 |
| | | | 345/168 |
| 2014/0098024 A1* | 4/2014 | Paek | G06F 3/04886 |
| | | | 345/168 |
| 2014/0310805 A1* | 10/2014 | Kandekar | G06F 21/36 |
| | | | 726/19 |
| 2014/0359513 A1* | 12/2014 | Starner | G06F 3/04886 |
| | | | 715/773 |
| 2014/0375568 A1* | 12/2014 | Berglund | G06F 3/0227 |
| | | | 345/169 |
| 2015/0101040 A1* | 4/2015 | Hayashi | G06F 21/31 |
| | | | 726/19 |
| 2016/0210452 A1* | 7/2016 | Pahud | G06F 21/32 |

\* cited by examiner

AUTHENTICATION USING A TOUCH-SENSITIVE KEYBOARD WITH DISTINCT PLURALITIES OF KEYS AS RESPECTIVE REGIONS

FIELD

The present application relates generally to authentication for access to a device and, more specifically, to authentication using a touch-sensitive keyboard.

BACKGROUND

As each generation of Smartphone becomes more important to the day-to-day life of individual users, protection of the often-sensitive data contained on a Smartphone become increasingly important. Such protection is typically provided by securing a Smartphone with one or more forms of authentication. That is, a user must successfully complete an authentication process to be granted access to the Smartphone.

Early authentication processes involved entering a numeric password. Later, alphanumeric passwords added some complexity and, arguably, made passwords more memorable. In further advanced authentication processes, a Smartphone presents an image and completing an authentication process involves swiping a finger between several points on the image.

Situations requiring authentication may include enabling access to a physical location or allowing use of a credit/debit card or similar instrument. Passwords are typically alphanumeric strings or sequences entered on a keyboard. Graphical authentication systems, where passwords are comprised of graphical components, also exist.

BRIEF DESCRIPTION OF THE DRAWINGS

Reference will now be made, by way of example, to the accompanying drawings which show example implementations; and in which.

DETAILED DESCRIPTION

For a computing device that employs a touch-sensitive keyboard, authentication may involve illustrating, to the electronic device, knowledge of a stored secret though providing input, at least in part, via the touch-sensitive keyboard.

According to an aspect of the present disclosure, there is provided a method of authenticating access to an electronic device having a touch-sensitive keyboard. The method includes detecting receipt of a candidate sequence of actions, the sequence of actions including a sensed movement on the touch-sensitive keyboard, responsive to the detecting, determining that the candidate sequence of actions matches a stored sequence of actions and responsive to the determining, allowing access to the electronic device. In other aspects of the present application, an electronic device is provided having a processor for carrying out this method and a computer readable medium is provided for adapting a processor in an electronic device to carry out this method.

Other aspects and features of the present disclosure will become apparent to those of ordinary skill in the art upon review of the following description of specific implementations of the disclosure in conjunction with the accompanying figures.

Figure 1:
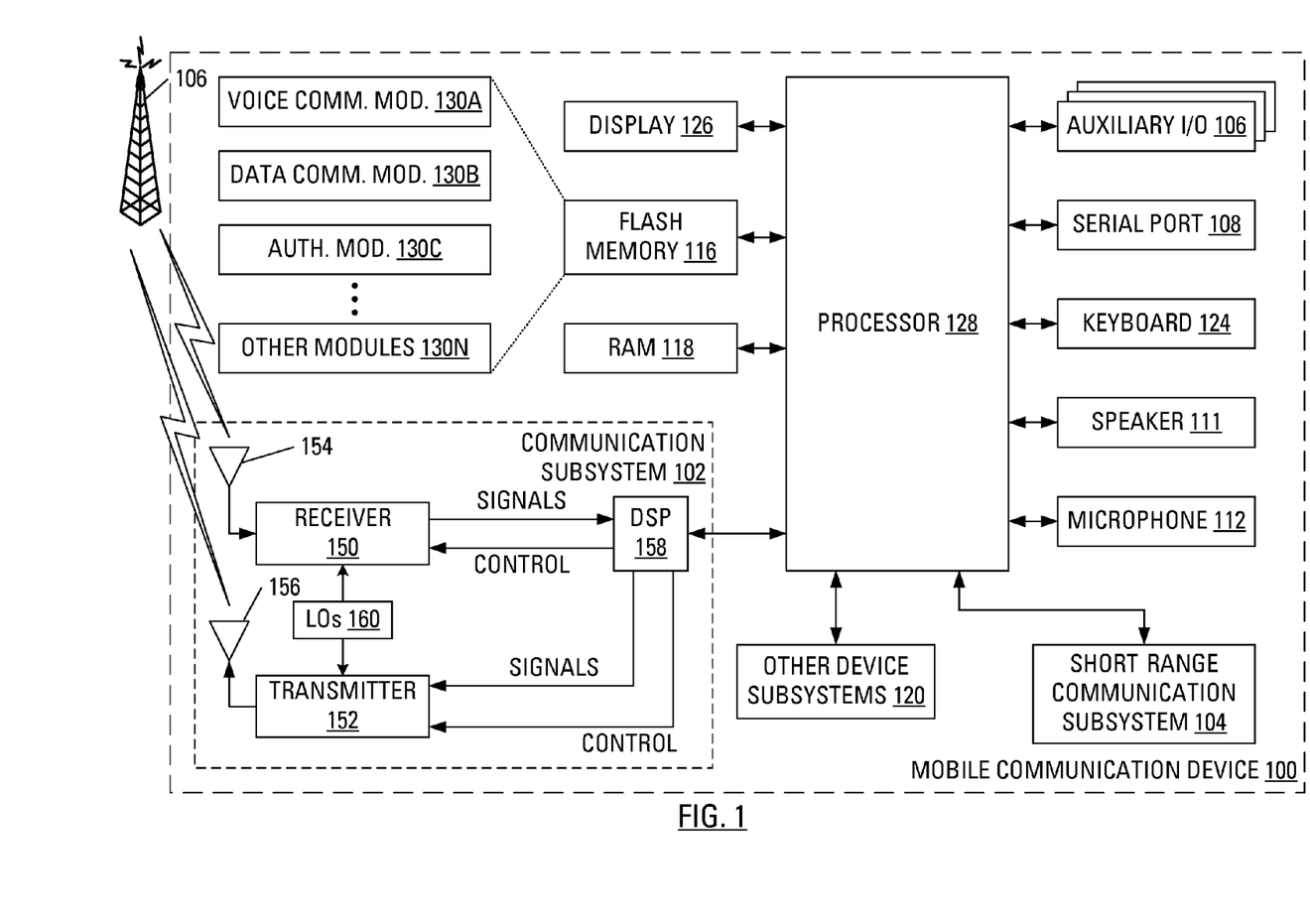
FIG. 1 illustrates a computing device as an example of a computing device that may carry out aspects of the present disclosure.

FIG. 1 illustrates a computing device 100 as an example of a computing device that may carry out aspects of the present disclosure. The computing device 100 may comprise a housing, an input device (e.g., a touch-sensitive keyboard 124 having a plurality of keys) and an output device (e.g., a display 126), which may comprise a full graphic, or full color, Liquid Crystal Display (LCD). In some embodiments, the display 126 may comprise a touchscreen display. Other types of output devices may alternatively be utilized. A processing device (a microprocessor 128) is shown schematically in FIG. 1 as coupled between the touch-sensitive keyboard 124 and the display 126. The microprocessor 128 controls the operation of the display 126, as well as the overall operation of the computing device 100, in part, responsive to actuation of the keys on the touch-sensitive keyboard 124 by a user.

Currently, several technological options are available for implementing the touch-sensitive keyboard 124. For one example, the touch-sensitive keyboard 124 may be implemented using technology that relies upon detecting changes in capacitance responsive to touch. For another example, the touch-sensitive keyboard 124 may be implemented using technology that relies upon detecting changes in resistance responsive to touch.

The housing may be elongated vertically, or may take on other sizes and shapes (including clamshell housing structures). In the case in which the touch-sensitive keyboard 124 includes keys that are associated with at least one alphabetic character and at least one numeric character, the touch-sensitive keyboard 124 may include a mode selection key, or other hardware or software, for switching between alphabetic entry and numeric entry.

In addition to the microprocessor 128, other optional parts of the computing device 100 are shown schematically in FIG. 1. These may include a communications subsystem 102, a short-range communications subsystem 104, the touch-sensitive keyboard 124 and the display 126. The computing device 100 may further include other input/output devices, such as a set of auxiliary I/O devices 106, a serial port 108, a speaker 111 and a microphone 112. The computing device 100 may further include memory devices including a flash memory 116 and a Random Access Memory (RAM) 118 and various other device subsystems 120. The computing device 100 may comprise a two-way radio frequency (RF) communication device having voice and data communication capabilities. In addition, the computing device 100 may have the capability to communicate with other computer systems via the Internet.

Operating system software executed by the microprocessor 128 may be stored in a computer readable medium, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the mobile device may also be stored to the RAM 118.

The microprocessor 128, in addition to its operating system functions, enables execution of software applications on the computing device 100. A set of software applications that control basic device operations, such as a voice communications module 130A and a data communications module 130B, may be installed on the computing device 100 during manufacture. An authentication module 130C may also be installed on the computing device 100 during manufacture, to implement aspects of the present disclosure. As well, additional software modules, illustrated as an other software module 130N, which may comprise, for instance, a personal information manager (PIM) application, may be installed during manufacture. The PIM application may be capable of organizing and managing data items, such as e-mail messages, calendar events, voice mail messages, appointments and task items. The PIM application may also be capable of sending and receiving data items via a wireless carrier network 170 represented by a radio tower. The data items managed by the PIM application may be seamlessly integrated, synchronized and updated via the wireless carrier network 170 with the device user's corresponding data items stored or associated with a host computer system.

Communication functions, including data and, optionally, voice communications, are performed through the communication subsystem 102 and, possibly, through the short-range communications subsystem 104. The communication subsystem 102 includes a receiver 150, a transmitter 152 and one or more antennas, illustrated as a receive antenna 154 and a transmit antenna 156. In addition, the communication subsystem 102 also includes a processing module, such as a digital signal processor (DSP) 158, and local oscillators (LOs) 160. The specific design and implementation of the communication subsystem 102 is dependent upon the communication network in which the computing device 100 is intended to operate. For example, the communication subsystem 102 of the computing device 100 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), Enhanced Data rates for GSM Evolution (EDGE), Universal Mobile Telecommunications System (UMTS), Wideband Code Division Multiple Access (W-CDMA), High Speed Packet Access (HSPA), Long Term Evolution (LTE), etc. Other types of data and voice networks, both separate and integrated, may also be utilized with the computing device 100.

Network access requirements vary depending upon the type of communication system. Typically, an identifier is associated with each mobile device that uniquely identifies the mobile device or subscriber to which the mobile device has been assigned. The identifier is unique within a specific network or network technology. For example, in Mobitex™ networks, mobile devices are registered on the network using a Mobitex Access Number (MAN) associated with each device and in DataTAC™ networks, mobile devices are registered on the network using a Logical Link Identifier (LLI) associated with each device. In GPRS networks, however, network access is associated with a subscriber or user of a device. A GPRS device therefore uses a subscriber identity module, commonly referred to as a Subscriber Identity Module (SIM), in order to operate on a GPRS network. Despite identifying a subscriber by SIM, mobile devices within GSM/GPRS networks are uniquely identified using an International Mobile Equipment Identity (IMEI) number.

When required network registration or activation procedures have been completed, the computing device 100 may send and receive communication signals over the wireless carrier network 170. Signals received from the wireless carrier network 170 by the receive antenna 154 are routed to the receiver 150, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the wireless carrier network 170 are processed (e.g., modulated and encoded) by the DSP 158 and are then provided to the transmitter 152 for digital to analog conversion, frequency up conversion, filtering, amplification and transmission to the wireless carrier network 170 (or networks) via the transmit antenna 156.

In addition to processing communication signals, the DSP 158 provides for control of the receiver 150 and the transmitter 152. For example, gains applied to communication signals in the receiver 150 and the transmitter 152 may be adaptively controlled through automatic gain control algorithms implemented in the DSP 158.

In a data communication mode, a received signal, such as a text message or web page download, is processed by the communication subsystem 102 and is input to the microprocessor 128. The received signal is then further processed by the microprocessor 128 for output to the display 126, or alternatively to some auxiliary I/O devices 106. A device user may also compose data items, such as e-mail messages, using the touch-sensitive keyboard 124 and/or some other auxiliary I/O device 106, such as a touchpad, a rocker switch, a thumb-wheel, a trackball, a touchscreen, or some other type of input device. The composed data items may then be transmitted over the wireless carrier network 170 via the communication subsystem 102.

In an optional voice communication mode, overall operation of the device is substantially similar to the data communication mode, except that received signals are output to the speaker 111, and signals for transmission are generated by a microphone 112. Alternative voice or audio I/O subsystems, such as a voice message recording subsystem, may also be implemented on the computing device 100. In addition, the display 126 may also be utilized in voice communication mode, for example, to display the identity of a calling party, the duration of a voice call, or other voice call related information.

The short-range communications subsystem 104 enables communication between the computing device 100 and other proximate systems or devices, which need not necessarily be similar devices. For example, the short-range communications subsystem may include an infrared device and associated circuits and components, or a Bluetooth™ communication module to provide for communication with similarly-enabled systems and devices, or a near field communication (NFC) module, etc.

Authenticating to an electronic device, such as the computing device 100, often requires a user to illustrate, to the electronic device, knowledge of a stored secret. It may be considered that there is a tradeoff between the security level of the stored secret and the ease of authenticating to the electronic device.

For the computing device 100 that employs the touch-sensitive keyboard 124, aspects of the present application relate to authentication that involves a user illustrating, to the electronic device, knowledge of a stored secret though providing input, at least in part, via the touch-sensitive keyboard 124.

In U.S. Pat. No. 8,063,879, which shares assignee with the present application and is hereby incorporated herein by reference, a handheld electronic device is disclosed. From the Abstract, one learns that the handheld electronic device includes a housing having a surface, a first input component having input members disposed external to the surface, a second touch sensitive input component disposed about the input members, the touch sensitive input component being separate and distinct from the input members. The first input component is structured to provide one of: a contact point with respect to the surface responsive to actuation of a first number of the input members; and a number of responses responsive to actuation of a second number of the input members. A processor cooperates with the first input component and the touch sensitive input component to determine if a plurality of the input members are actuated contemporaneously and to output a representation of a single one of the input members based upon one of: the contact point; and the number of responses.

Indeed, U.S. Pat. No. 8,063,879 discloses a handheld electronic device with a touch-sensitive keyboard. For one form of input, a processor may receive an indication of user actuation of a key among the keys in the keyboard. For another form of input, the processor may receive one or more indications of location of instances of user touches on the keyboard.

Figure 2:
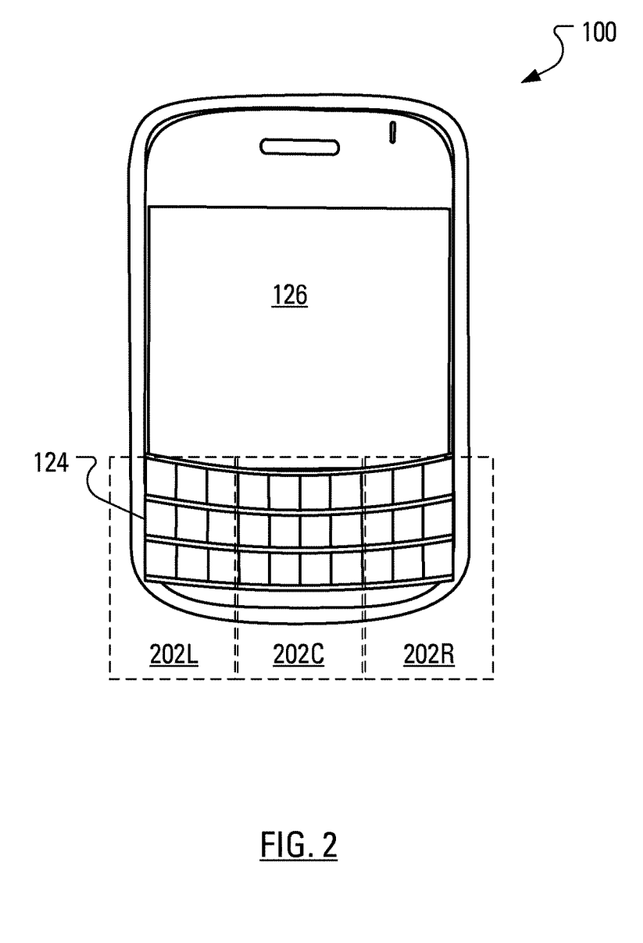
FIG. 2 illustrates a touch-sensitive keyboard of the computing device of FIG. 1 divided into a plurality of regions in accordance with embodiments of the present disclosure.

In preparation for using authentication methods representative of aspects of the present disclosure, the computing device 100 may be configured to consider the touch-sensitive keyboard 124 as being divided into a plurality of regions (see FIG. 2). The regions may be collectively or individually referenced herein by the reference numeral 202.

In FIG. 2, the touch-sensitive keyboard 124 is illustrated as being divided into three regions: a left region 202L; a center region 202C; and a right region 202R. Notably, the range for a number (N) of regions may be configured to extend from 1 to M, where M is representative of the number of keys in the touch-sensitive keyboard 124. In the example illustrated in FIG. 2, N=3 and M=30.

In further preparation for using authentication methods representative of aspects of the present disclosure, the computing device 100 may be configured to consider any one of the following events as an "action": an actuation of a key; and a swipe. The term "swipe" may be defined as a sensed movement on the touch-sensitive keyboard 124. The sensed movement may, in particular, be defined by a start location and an end location such that the start location and the end location define a direction for the swipe.

Notably, it is the touch-sensitive feature of the touch-sensitive keyboard 124 that allows for receipt of a swipe being considered as an action. For example quantization purposes, a given swipe may be characterized as being representative of one four directions: up-to-down; down-to-up; right-to-left; and left-to-right. It should be clear that other quantization schemes may be defined, with each scheme having greater or fewer directions.

Each action may be further characterized by the region in which the action takes place. Each possible combination of an action and a region may be considered as a "character" in an "alphabet." The alphabet may be considered a set of combinations, a subset of which may be strung together to form a secret. Indeed, the alphabet may be expanded by including, in the alphabet, characters that are defined as a directional swipe that begins in one region and ends in another region. The alphabet may be further expanded by including, in the alphabet, characters that are defined as concurrent actuation of multiple keys in two or more regions. The alphabet may be still further expanded by including, in the alphabet, characters that are defined as concurrent swipes in two or more regions.

It may be considered that an end result of configuring the computing device 100 with regions and, thereby, establishing a set of valid actions, is that a set of characters has been defined. Notably, it may not necessarily be a task left for the user to configure the computing device 100 with regions, actions and/or characters. Indeed, the computing device 100 may arrive in the hands of the user with the regions, actions and/or characters previously configured, say, by a manufacturer of the computing device 100.

With an awareness of the set of available characters, a user may proceed to create a sequence of characters, which may be stored as the stored secret that must be matched for authentication to the computing device 100.

If the list of available actions is restricted to regional key presses and regional swipes with the number of regions, N, set to three as in FIG. 2, then the alphabet has 15 characters:

| Character index | Action |
| --- | --- |
| 1 | Key actuation in the left region 202L |
| 2 | Key actuation in the center region 202C |
| 3 | Key actuation in the right region 202R |
| 4 | Up-to-down swipe in the left region 202L |
| 5 | Up-to-down swipe in the center region 202C |
| 6 | Up-to-down swipe in the right region 202R |
| 7 | Down-to-up swipe in the left region 202L |
| 8 | Down-to-up swipe in the center region 202C |
| 9 | Down-to-up swipe in the right region 202R |
| 10 | Right-to-left swipe in the left region 202L |
| 11 | Right-to-left swipe in the center region 202C |
| 12 | Right-to-left swipe in the right region 202R |
| 13 | Left-to-right swipe in the left region 202L |
| 14 | Left-to-right swipe in the center region 202C |
| 15 | Left-to-right swipe in the right region 202R |

In embodiments wherein the display 126 comprises a touchscreen display, actions such as screen gestures (directional swipes) on the display 126 can be considered to add four more characters to the alphabet:

| Character index | Action |
| --- | --- |
| 16 | Up-to-down swipe on the display 126 |
| 17 | Down-to-up swipe on the display 126 |
| 18 | Right-to-left swipe on the display 126 |
| 19 | Left-to-right swipe on the display 126 |

As mentioned hereinbefore, characters may be defined as concurrent actuation of multiple keys in two or more regions, thereby providing further characters, such as:

| Character index | Action |
| --- | --- |
| 20 | Concurrent key actuation in the left region 202L and in the center region 202C |

| Character index | Action |
| --- | --- |
| 21 | Concurrent key actuation in the left region 202L and in the right region 202R |
| 22 | Concurrent key actuation in the center region 202C and in the right region 202R |

As mentioned hereinbefore, the alphabet may be still further expanded by including, in the alphabet, characters that are defined as concurrent swipes (any direction) in two or more regions, such as:

| Character index | Action |
| --- | --- |
| 23 | Concurrent swipe in the left region 202L and in the center region 202C |
| 24 | Concurrent swipe in the left region 202L and in the right region 202R |
| 25 | Concurrent swipe in the center region 202C and in the right region 202R |

As mentioned hereinbefore, the alphabet may be further expanded by including, in the alphabet, characters that are defined as a directional swipe that begins in one region and ends in another region, such as:

| Character index | Action |
| --- | --- |
| 26 | Swipe begins in the left region 202L and ends in the center region 202C |
| 27 | Swipe begins in the left region 202L and ends in the right region 202R |
| 28 | Swipe begins in the center region 202C and ends in the right region 202R |
| 29 | Swipe begins in the center region 202C and ends in the left region 202L |
| 30 | Swipe begins in the right region 202R and ends in the center region 202C |
| 31 | Swipe begins in the right region 202R and ends in the left region 202L |

In the preceding, there exists 31 individual characters that may be used in a sequence to form a stored secret. Notably, each character may be represented by five bits.

Figure 3A:
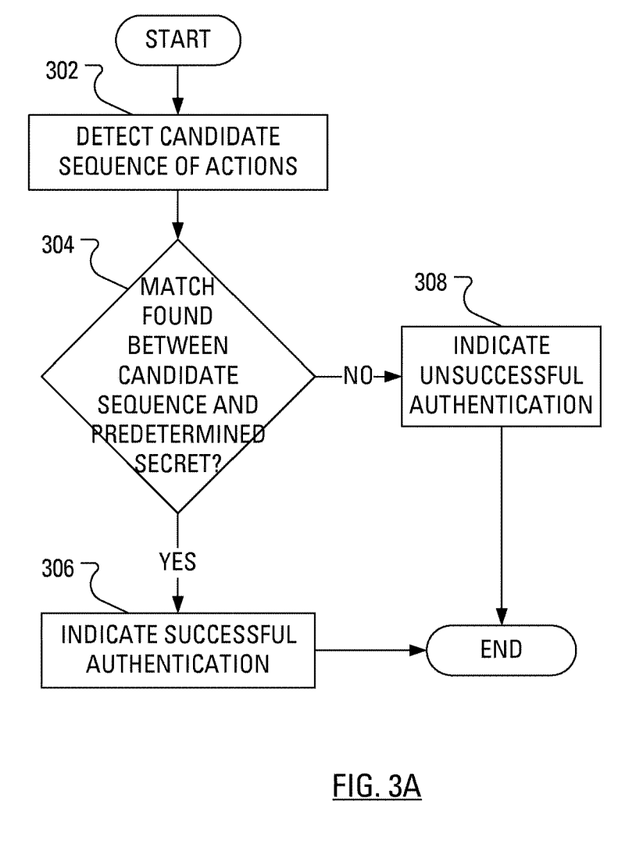
FIG. 3A illustrates example steps in a method of authenticating a user of the computing device in accordance with embodiments of the present disclosure.
Figure 3B:
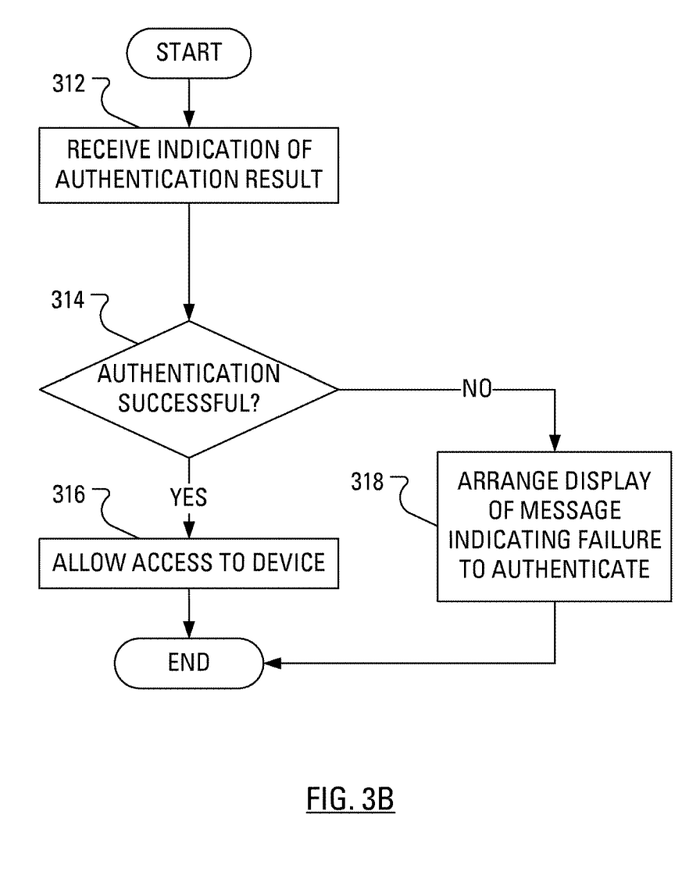
FIG. 3B illustrates example steps in a method of authenticating a user of the computing device in accordance with embodiments of the present disclosure.

FIGS. 3A and 3B illustrate example steps in a method of authenticating a user of the computing device 100. In FIG. 3A, the authentication module 130C may detect receipt, via, at least in part, the touch-sensitive keyboard 124, of a candidate sequence of actions or, as they have been discussed hereinbefore, "characters." Subsequent to detecting (step 302) receipt of the candidate sequence of characters, the authentication module 130C may determine (step 304) whether the user has successfully provided a sequence of characters that matches the stored secret. That is, the authentication module 130C may determine (step 304) whether the user has successfully provided a candidate sequence of characters that matches the stored sequence of characters. Responsive to determining (step 304) a successful match, the authentication module 130C may indicate (step 306), to the microprocessor 128, an authentication result. More specifically, the authentication module 130C may indicate (step 306), to the microprocessor 128, that the authentication was successful. Responsive to determining (step 304) a failed match, the authentication module 130C may indicate (step 308), to the microprocessor 128, an authentication result. More specifically, the authentication module 130C may indicate (step 308), to the microprocessor 128, that the authentication was unsuccessful.

In FIG. 3B, upon receiving (step 312) an indication of the authentication result, the authentication module 130C may determine (step 314), from the received authentication result, whether the authentication was successful. Upon determining (step 314), from the received authentication result, that the authentication was successful, the authentication module 130C may allow access (step 316) to the computing device 100.

Upon determining (step 314), from the received authentication result, that the authentication was unsuccessful, the authentication module 130C may arrange (step 316) display of a message indicating a failure to authenticate. The message may, for example, be arranged to be displayed on the display 126.

Notably, authentication employing the touch-sensitive keyboard 124 need not rely upon division into regions. Indeed, a pattern of key presses ("P," key actuations) interspersed with key-to-key movements and ending with a lift may be established as a stored secret. Conveniently, responsive to such a pattern being provided anywhere on the touch-sensitive keyboard, authentication may be considered complete and access to the computing device 100 may be granted.

Figure 4:
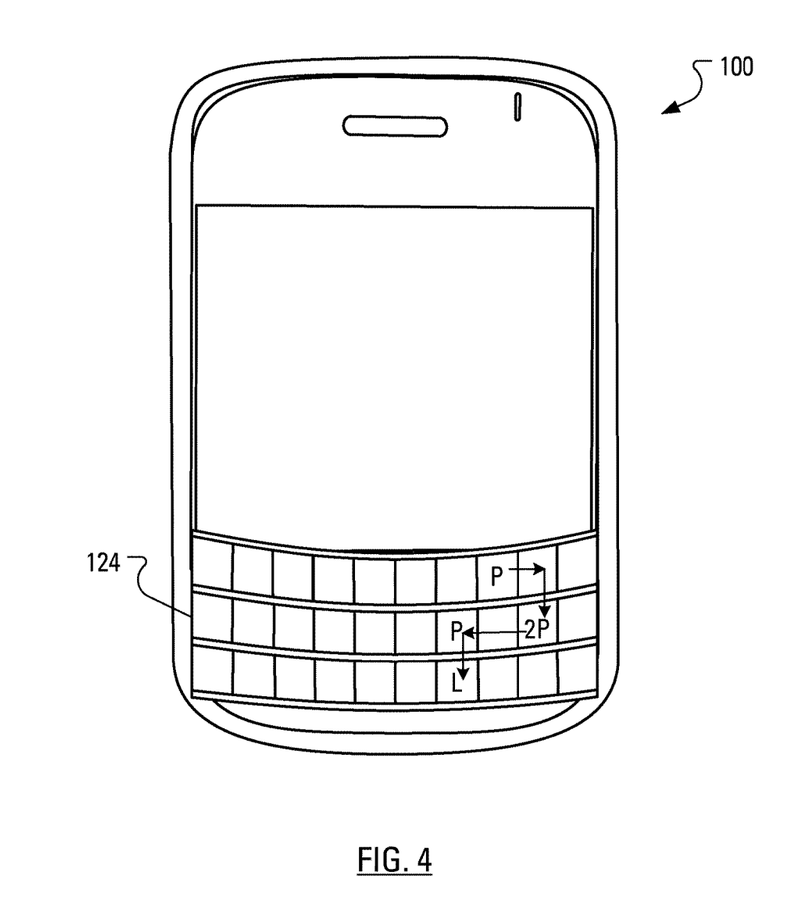
FIG. 4 illustrates a touch-sensitive keyboard of the computing device of FIG. 1 overlaid with a pattern of key presses interspersed with key-to-key movements and ending with a lift in accordance with embodiments of the present disclosure.

An example pattern is illustrated in FIG. 4 overlaid upon the touch-sensitive keyboard 124 of the computing device 100. The example pattern has the following sequence:

| Step | Action |
| --- | --- |
| 1 | Key actuation |
| 2 | Key-to-key movement, one key to the right |
| 3 | Key-to-key movement, one key down |
| 4 | Key actuation |
| 5 | Key actuation |
| 6 | Key-to-key movement, two keys to the left |
| 7 | Key actuation |
| 8 | Key-to-key movement, one key down |
| 9 | Lift |

In one instance, the sequence of letters for the keys touched by the user may be i-o-l-k-j-b. However, not all keys are pressed. As such, the key press pattern is distinct from the sequence of letters for the keys touched. In the same instance, the key press pattern may be represented as i-o-l-l-j. Notably, among the keys touched, the keys associated with letters k and b are not pressed. The key associated with the letter k is traversed on the way from l to j. The key associated with the letter b is the last key touched before the user's finger is lifted from contact with the touch-sensitive keyboard 124.

In another instance, the sequence of letters for the keys touched by the user may be t-y-h-g-f-v and the key press pattern may be represented as t-y-h-h-f.

Notably, when the touch-sensitive keyboard 124 detects that the user has lifted the finger from contact, the provision of the candidate sequence of characters may be considered complete and the authentication module 130C may proceed to determine (step 304) whether the user has successfully provided a candidate sequence of characters that matches the stored sequence of characters.

Conveniently, in many instances, a sequence of characters (actions) may be provided by a user using only a single hand. Furthermore, since actions may be regional or relative to each other, the user may be able to provide a sequence of characters (actions) without looking at the touch-sensitive keyboard 124.

The above-described implementations of the present application are intended to be examples only. Alterations, modifications and variations may be effected to the particular implementations by those skilled in the art without departing from the scope of the application, which is defined by the claims appended hereto.

What is claimed is:

1. A method of authenticating access to an electronic device having a display and a touch-sensitive keyboard distinct from the display, wherein the electronic device is configured to consider distinct pluralities of keys on the touch-sensitive keyboard to be respective regions, the method comprising:
   detecting receipt of a candidate sequence of actions, the candidate sequence of actions including:
      a plurality of concurrent directional swipes on the touch-sensitive keyboard; and
      a key press on the touch-sensitive keyboard;
   responsive to the detecting,
      associating each directional swipe among the plurality of directional swipes with:
         a region among the regions in which each directional swipe begins; and
         a region among the regions in which each directional swipe ends;
      associating the key press with at least one of the regions;
      determining that the candidate sequence of actions matches a stored sequence of actions; and
   responsive to the determining, allowing access to the electronic device.

2. The method of claim 1 wherein the sequence of actions further comprises concurrent key presses of a first key and a second key on the touch-sensitive keyboard.

3. The method of claim 2 wherein the electronic device is configured to consider a first plurality of keys on the touch-sensitive keyboard to be a first region and a second plurality of keys on the touch-sensitive keyboard to be a second region and wherein the method further comprises associating the key press of the first key with the first region and associating the key press of the second key with the second region.

4. The method of claim 1 wherein the electronic device is configured to consider a first plurality of keys on the touch-sensitive keyboard to be a first region and a second plurality of keys on the touch-sensitive keyboard to be a second region and wherein the method further comprises associating a first directional swipe with the first region and associating a second directional swipe, which is concurrent with the first directional swipe, with the second region.

5. The method of claim 1 wherein the display comprises a touch-sensitive display and wherein the sequence of actions further comprises a sensed movement on the touch-sensitive display.

6. An electronic device comprising:
   a display;
   a touch-sensitive keyboard distinct from the display, wherein the electronic device is configured to consider distinct pluralities of keys on the touch-sensitive keyboard to be respective regions; and
   a processor adapted to:
      detect receipt of a candidate sequence of actions, the sequence of actions including:
         a plurality of concurrent directional swipes on the touch-sensitive keyboard; and
         a key press on the touch-sensitive keyboard;
      associate each directional swipe among the plurality of directional swipes with:
         a region among the regions in which each directional swipe begins; and
         a region among the regions in which each directional swipe ends;
      associate the key press with at least one of the regions;
      determine that the candidate sequence of actions matches a stored sequence of actions; and
      allow access to the electronic device.

7. The electronic device of claim 6 wherein the touch-sensitive keyboard is configured to:
   detect a change in capacitance responsive to a touch; or
   detect a change in resistance responsive to a touch.

8. The electronic device of claim 6 wherein the sequence of actions further comprises concurrent key presses of a first key and a second key on the touch-sensitive keyboard.

9. The electronic device of claim 8 wherein the processor is configured to consider a first plurality of keys on the touch-sensitive keyboard to be a first region and a second plurality of keys on the touch-sensitive keyboard to be a second region and wherein the processor is further adapted to associate the key press of the first key with the first region and to associate the key press of the second key with the second region.

10. The electronic device of claim 6 wherein the processor is configured to consider a first plurality of keys on the touch-sensitive keyboard to be a first region and a second plurality of keys on the touch-sensitive keyboard to be a second region and wherein the processor is further adapted to associate a first directional swipe with the first region and to associate a second directional swipe, which is concurrent with the first directional swipe, with the second region.

11. The electronic device of claim 6 wherein the display comprises a touch-sensitive display and wherein the sequence of actions further comprises a sensed movement on the touch-sensitive display.

12. A non-transitory computer readable medium having stored thereon computer executable instructions, the computer executable instructions comprising code that, upon execution by a processor in an electronic device having a display and a touch-sensitive keyboard distinct from the display, wherein the electronic device is configured to consider distinct pluralities of keys on the touch-sensitive keyboard to be respective regions, causes the processor to:
   detect receipt of a candidate sequence of actions, the sequence of actions including:
      a plurality of concurrent directional swipes on the touch-sensitive keyboard; and
      a key press on the touch-sensitive keyboard;
   associate each directional swipe among the plurality of directional swipes with:
      a region among the regions in which each directional swipe begins; and
      a region among the regions in which each directional swipe ends;
   associate the key press with at least one of the regions;
   determine that the candidate sequence of actions matches a stored sequence of actions; and
   allow access to the electronic device.

13. The computer readable medium of claim 12 wherein the sequence of actions further comprises concurrent key presses of a first key and a second key on the touch-sensitive keyboard.

14. The computer readable medium of claim 13 wherein the instructions further comprise code that causes the processor to consider a first plurality of keys on the touch-sensitive keyboard to be a first region and a second plurality of keys on the touch-sensitive keyboard to be a second region and wherein the instructions further comprise code that causes the processor to associate the key press of the first key with the first region and to associate the key press of the second key with the second region.

15. The computer readable medium of claim 12 wherein the instructions further comprise code that causes the processor to consider a first plurality of keys on the touch-sensitive keyboard to be a first region and a second plurality of keys on the touch-sensitive keyboard to be a second region and wherein the processor is further adapted to associate a first directional swipe with the first region and to associate a second directional swipe, which is concurrent with the first directional swipe, with the second region.

* * * * *